United States Patent
McKee et al.

[11] Patent Number: 5,969,442
[45] Date of Patent: Oct. 19, 1999

[54] REACTION PROPULSION MOTOR AND APPARATUS FOR USING THE SAME

[75] Inventors: John Michael McKee, Hillsboro Beach; Neil Johan Schmertmann, Boynton Beach, both of Fla.

[73] Assignee: Motorola, Inc., Schaumburg, Ill.

[21] Appl. No.: 08/992,686

[22] Filed: Dec. 17, 1997

[51] Int. Cl.⁶ .......................... H02K 33/00; H02K 57/00
[52] U.S. Cl. .................................. 310/12; 310/20
[58] Field of Search .................. 310/12, 13, 14, 310/80, 20; 318/135

[56] References Cited

U.S. PATENT DOCUMENTS

| | | | |
|---|---|---|---|
| 4,803,387 | 2/1989 | Seider | 310/12 |
| 5,281,875 | 1/1994 | Kiesewetter et al. | 310/36 |
| 5,546,069 | 8/1996 | Holden et al. | 340/407.1 |
| 5,650,763 | 7/1997 | McKee et al. | 340/407.1 |
| 5,825,297 | 10/1998 | Mooney et al. | 340/825.46 |
| 5,831,354 | 11/1998 | Stopplecamp | 310/12 |

Primary Examiner—Nestor Ramirez
Assistant Examiner—Judson H. Jones
Attorney, Agent, or Firm—Philip P. Macnak

[57] ABSTRACT

A reaction propulsion motor (200) utilizes a taut armature reciprocating impulse transducer (100) having a motional mass (18) to generate an excitation force in response to an excitation signal. A conveyor element (204) translates the excitation force into locomotion. A transmission medium (202) is coupled between the taut armature reciprocating impulse transducer (100) and the conveyor element (204) to couple the excitation force generated to the conveyor element (204).

22 Claims, 5 Drawing Sheets

REACTION PROPULSION MOTOR AND APPARATUS FOR USING THE SAME

FIELD OF THE INVENTION

This invention relates in general to linear motors, and more specifically to a reaction propulsion motor which provides variable speed and is bidirectional.

BACKGROUND OF THE INVENTION

Prior art linear motors required rotors and stators, wherein the stator was part of a track on which the rotor traveled to produce locomotion. Thus the prior art linear motors were not capable of being used, except by providing a track which guided the linear motor between locations.

Thus what is needed is a linear motor which can provide locomotion without the use of a track or guide.

DESCRIPTION OF THE PREFERRED EMBODIMENTS

Figure 1:
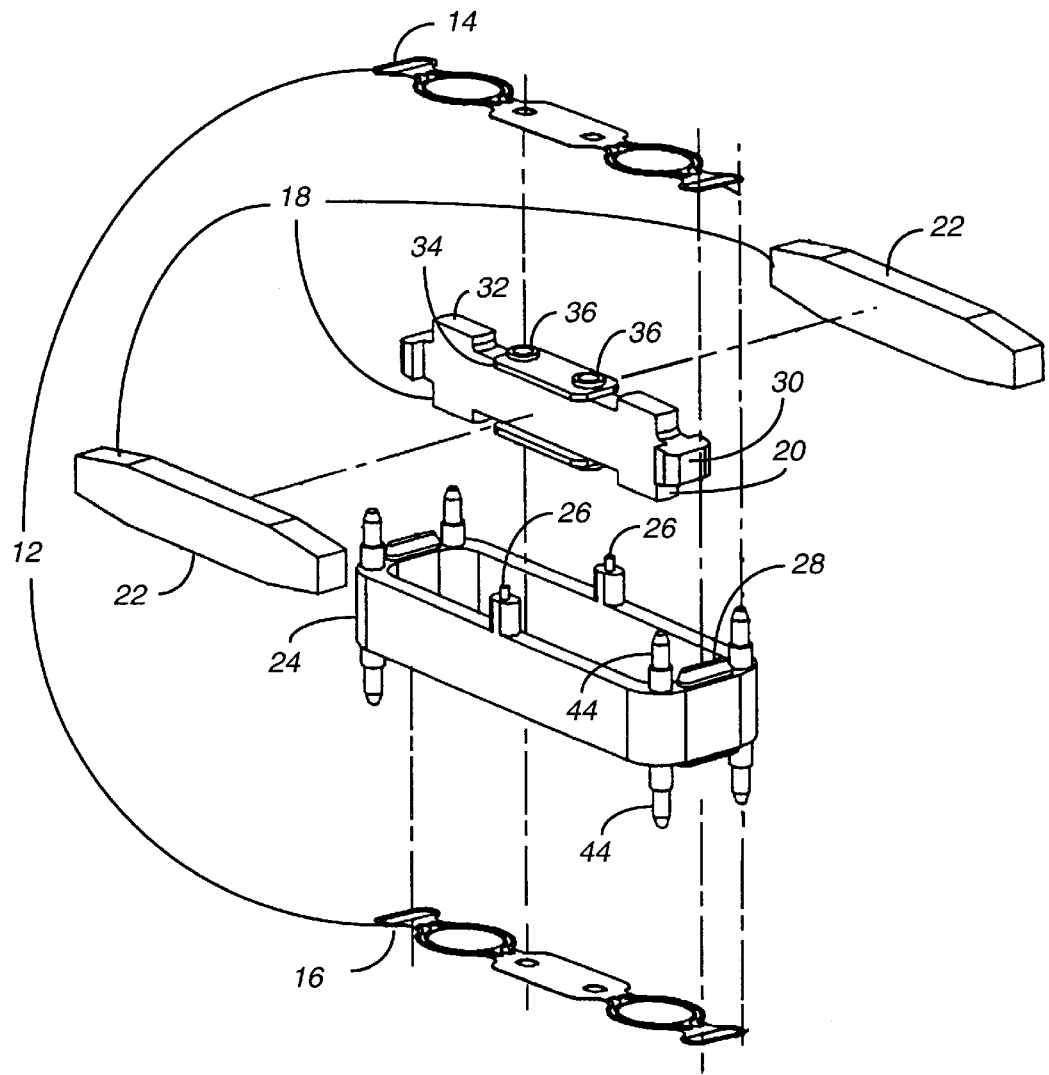
FIG. 1 is an exploded view of a taut armature reciprocating impulse transducer.

FIG. 1 is an exploded view of a taut armature reciprocating impulse transducer 100 in accordance with the present invention. The taut armature reciprocating impulse transducer 100 comprises an armature 12 which includes an upper non-linear suspension member 14 and a lower non-linear resonant suspension member 16, a support frame 24 including a coil 26, and a magnetic motional mass 18 including a magnet mount 20 and two permanent magnets 22, The support frame 24 and the coil 26 (shown only by the coil terminations) in combination are referred to as an electromagnetic driver which is used to effect an alternating electromagnetic field. The electromagnetic driver is preferably manufactured using an injection molding process wherein the coil 26 is molded into the support frame 24, although it will be appreciated that there are other processes for manufacture which can be utilized as well. The upper non-linear suspension member 14 and the lower non-linear suspension member 16 are attached to the support frame 24 by four bosses, of which boss 28 is typical and only three of which are visible.

The magnetic motional mass 18 comprises a magnet support 20 and two permanent magnets 22. The magnet support 20 is shaped to provide end restraints 30 and top to bottom restraints 34 which are used to locate the permanent magnets 22 during assembly to the magnet support 20. The magnet support 20 further includes piers, of which pier 32 is typical, provided to maximize the mass to volume ratio of the magnet support 20 and which fit within the opening of the upper and lower non-linear suspension members 14 and 16. The thickness of the magnet support 20 is reduced at the end restraints 30 to maximize the excursion of the magnetic motional mass 18 during operation. Four flanges, of which two flanges 36 are shown, are used to secure the upper non-linear suspension member 14 and a lower non-linear suspension member 16 to the magnet support 20.

Figure 2:
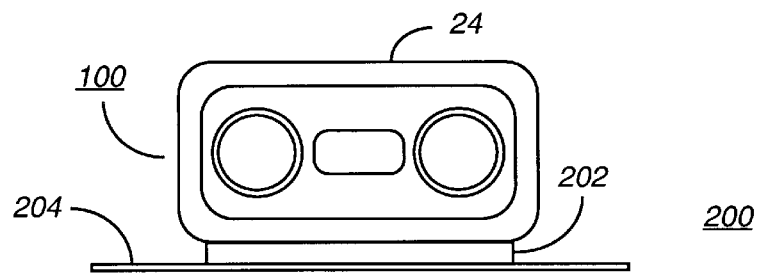
FIGS. 2 and 3 are side and top elevational views, respectively, of a reaction propulsion motor in accordance with the present invention.
Figure 3:
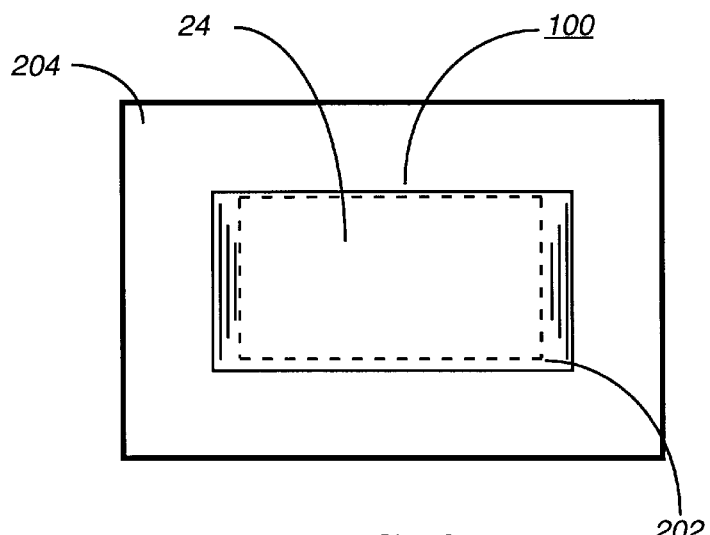

FIGS. 2 and 3 are side and bottom elevational views of a reaction propulsion motor 200 in accordance with the present invention. The reaction propulsion motor 200 utilizes the taut armature reciprocating impulse transducer 100, described above, and which is described in detail in U.S. Pat. No. 5,546,069 issued Aug. 13, 1996 to Holden et al. which is assigned to the assignee of the present invention and which is incorporated by reference herein. The taut armature reciprocating impulse transducer 100 is mounted on its side, as shown, to which a transmission medium 202, which by way of example is a double sided adhesive foam tape, such as Series 4016 manufactured by 3M Company of St. Paul, Minn., is firmly attached to the support frame 24 by the adhesive. Attached to the opposite side of the transmission medium 202 is a conveyor element 204 which is also firmly attached to the support frame 24 by the adhesive. The double sided adhesive foam tape forming the transmission medium 202 is formed to have substantially the same area as the side wall of the support frame 24. The conveyor element 204 is a square or rectangular plate having a surface area larger that the side wall of the support frame 24. The conveyor element 204 is formed from a flexible material, and depending upon the application of the reaction propulsion motor 200, can be a fiberboard material such as a sheet of cardboard; a polymer material, such as a sheet of plastic, or a high durometer rubber material. The conveyor element 204 must be rigid enough to be self-supporting so as to maintain its shape, and yet be flexible so as to provide locomotion as will be described below.

Figure 4:
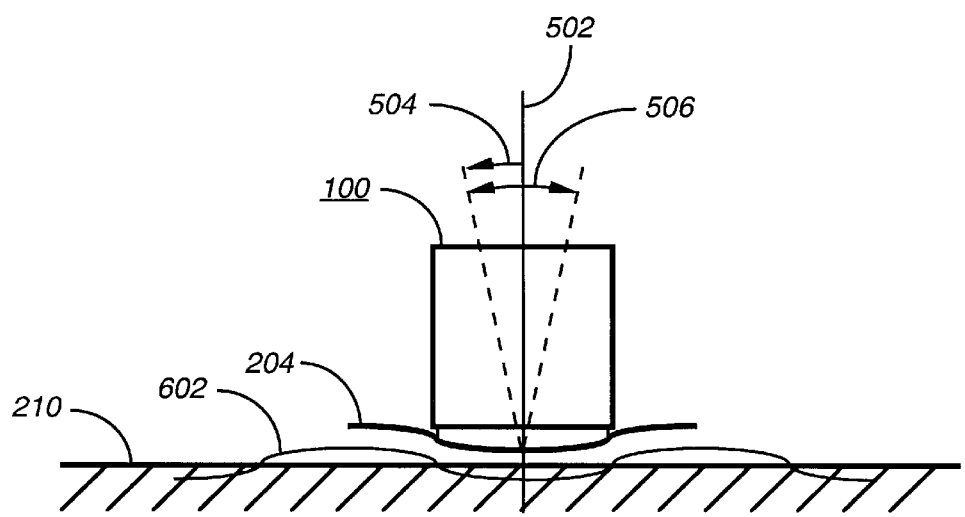
FIG. 4 is a mechanical diagram depicting the mechanics of locomotion for the reaction propulsion motor in accordance with the present invention.

FIG. 4 is a mechanical diagram depicting the mechanics of locomotion for the reaction propulsion motor 200 in accordance with the present invention. When the reaction propulsion motor 200 is positioned on a surface 210, such as a flat tabletop, floor, or other surface; and is energized by an excitation source, such as a variable frequency oscillator, locomotion ensues. The excitation source is typically set to an initial predetermined excitation frequency, whereupon the taut armature reciprocating impulse transducer 100 is allowed by the transmission medium 202 to rock back-and-forth at the initial predetermined excitation frequency about a central axis 502 in a first direction 504 and alternately in a second, opposite, direction 506 due to the movement of the motional mass within the support frame 24. The rocking movement of the taut armature reciprocating impulse transducer 100 is coupled through the transmission medium 202 to the conveyor element 204, which causes the conveyor element 204 which is flexible to deform, as shown, which results in movement of the reaction propulsion motor 200 over the surface 210. It will be appreciated that the amount of deformation of the conveyor element 204 shown in FIG.

4 is highly exaggerated for purposes of illustration only. As the reaction propulsion motor 200 travels across the surface 210, the flexing of the conveyor element 204 as locomotion occurs is depicted by waveform 602.

The nature of the material utilized to form the conveyor element 204 is determined by a number of factors, of which power rating of the taut armature reciprocating impulse transducer 100 is a primary factor. For very low power ratings, such as those in the tens of milliwatts range, the conveyor material is relatively thin, generally less than 0.01 inch (0.25 mm). As described above, the material for the conveyor element must be flexible, so as to be able to be deformed, and it will be appreciated that the thinner the material for the conveyor element 204, the greater the deformation, and therefor the higher the speed of locomotion. As the material thickness is increased, the less the deformation, and correspondingly, the slower the speed of locomotion. Thus for a given excitation frequency, the speed of locomotion is related to the flexibility of the material used for the conveyor element, i.e., high flexibility corresponds to higher speeds being produced, and lower flexibility corresponds to lower speeds being produced. The taut armature reciprocating impulse transducer 100 can be scaled up so as to operate at significantly higher power ratings, and correspondingly there will be an increases in the thickness of the conveyor element 204 which can be utilized, and selection of materials which can be utilized.

Figure 5:
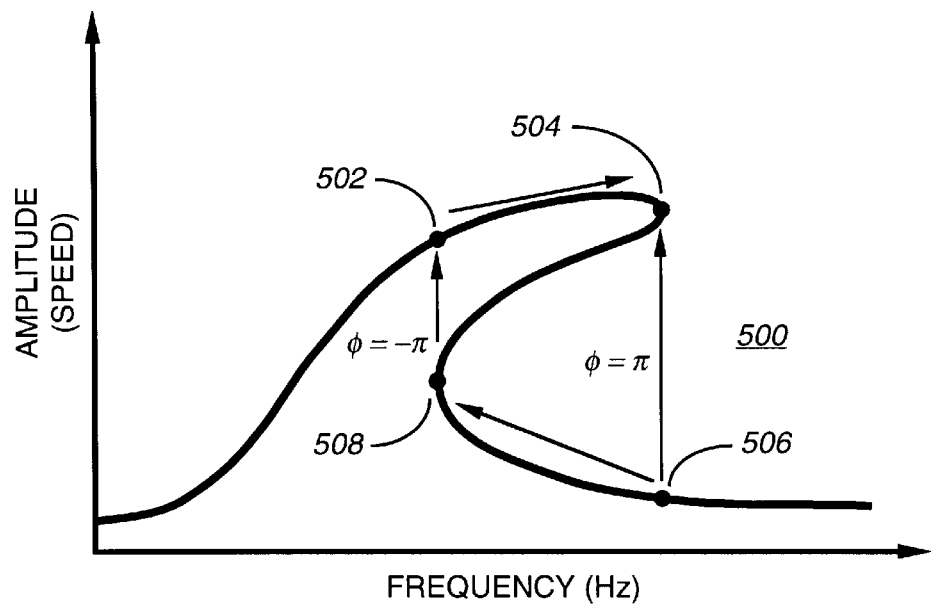
FIG. 5 is a graph depicting the impulse output as a function of frequency for taut armature resonant impulse transducer utilized in the reaction propulsion motor in accordance with the present invention.

FIG. 5 is a graph depicting the impulse output as a function of excitation frequency for a taut armature resonant impulse transducer suitable for use in the reaction propulsion motor in accordance with the present invention. The curve 500, illustrated in the graph of FIG. 5 is derived from the viscously damped Duffing equation $$(1 \pm 3\kappa^2\chi^2/4 - \omega^2/p^2)^2 + 4\nu^2\omega^2/p^2 = F^2/k^2\chi^2 \tan\psi = (2\nu\omega/p)/(1 \pm 3\kappa^2\chi^2/4 - \omega^2/p^2)$$

where $\chi$ is the response amplitude $\kappa$ is a constant of dimension $L^{-1}$ $\omega$ is the natural frequency $\nu$ is the damping factor $\omega/p$ is the "natural behavior"

± where + refers to a hardening spring response where $\chi$ is in phase with the excitation force refers to a softening spring response where $\chi$ is $\pi$ radians out of phase with the excitation force The viscously damped Duffing equation defines the operation of a taut armature reciprocating impulse transducer utilizing non-linear springs. The horizontal axis depicts excitation frequency while the vertical axis depicts the magnitude of displacement of the motional mass, also referred to herein as amplitude of oscillation or response amplitude. When the taut armature reciprocating impulse transducer 100 is driven by an excitation frequency such as depicted by point 502, the reaction propulsion motor 200 begins to move at a rate of speed related to the amplitude of oscillation of the motional mass and the characteristics of the conveyor element 204. As the excitation frequency is increased, such as between point 502 and point 504, the amplitude of oscillation increases, which results in an increasing rate of locomotion. At point 504, the amplitude of oscillation of the motion mass becomes unstable and "jumps" to a substantially lower amplitude of oscillation, as depicted at point 506. During the "jump", there occurs a 180° phase shift in the movement of the motion mass, which results in movement of the reaction propulsion motor 200 in a direction opposite the present direction of travel.

As the frequency is decreased, between point 506 and point 508, the amplitude of oscillation again increases, which results in an increase in the speed of the reaction propulsion motor 200 in the opposite direction. Since the amplitude of oscillation in the "forward" direction is greater than in the "reverse" direction, as shown in FIG. 5, the speed in the "forward" direction, i.e. which occurs along curve 500 between points 502 and 504 is substantially greater than the speed in the "reverse" direction, which occurs along curve 500 between points 506 and 508. Once the excitation frequency has reached that depicted by point 508, the amplitude of oscillation of the motion mass again becomes unstable and "jumps", this time to a substantially higher amplitude of oscillation, as depicted at point 502. There also occurs a 180° phase shift in the movement of the motion mass, which results in movement of the reaction propulsion motor 200 in a direction opposite the present direction of travel.

From the description provided above, it is clear that the direction of motion can be predetermined. When locomotion in the "forward" direction is required, an initial frequency is set to a frequency lower than the excitation frequency depicted by point 502 or point 508, and is increased until the desired speed of locomotion is obtained. Likewise, when locomotion in the "reverse" direction is required, the initial frequency is set to an excitation frequency higher than the frequency depicted by point 504 or point 506, and is decreased until the desired speed of locomotion is obtained. The ability to control the direction of locomotion greatly increases the utility of the reaction propulsion motor as will be described below.

Figure 6:
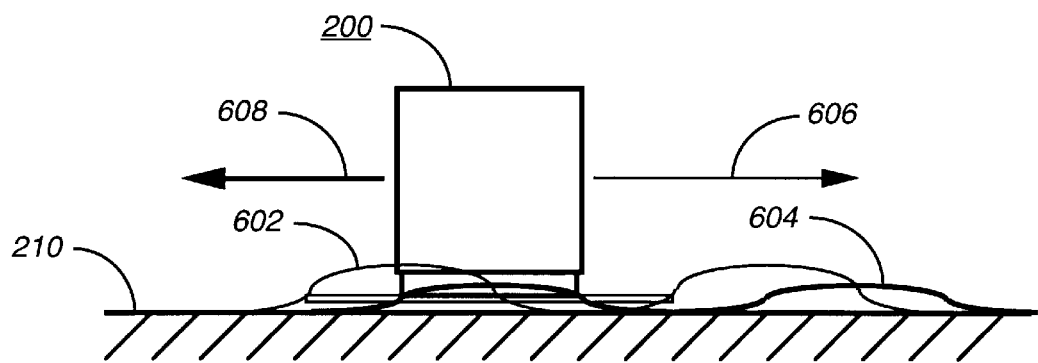
FIG. 6 is a mechanical diagram illustrating the bidirectional locomotion of the reaction propulsion motor in accordance with the present invention.

FIG. 6 is a mechanical diagram illustrating the bidirectional locomotion capability of the reaction propulsion motor 200 in accordance with the present invention. As shown in FIG. 6, the bidirectional reaction propulsion motor 200 can be propelled along the surface 210, such as in a direction and speed depicted by arrow 606. During travel in the direction depicted by arrow 606, the flexing of the conveyor element 204 which is generating the movement is depicted by waveform 602. At a point 504, described above, when the "jump" in amplitude of oscillation occurs, the amplitude of oscillation of the motional mass of the taut armature reciprocating impulse transducer 100 is substantially reduced and is 180° out-of-phase, resulting the reaction propulsion motor 200 being propelled along the surface 210, such as in a direction and speed depicted by arrow 608, the speed being substantially slower and in an opposite direction, even though the excitation frequency has not changed. The flexing of the conveyor element 204 which is generating the movement in the opposite direction is depicted by waveform 604.

Figure 7:
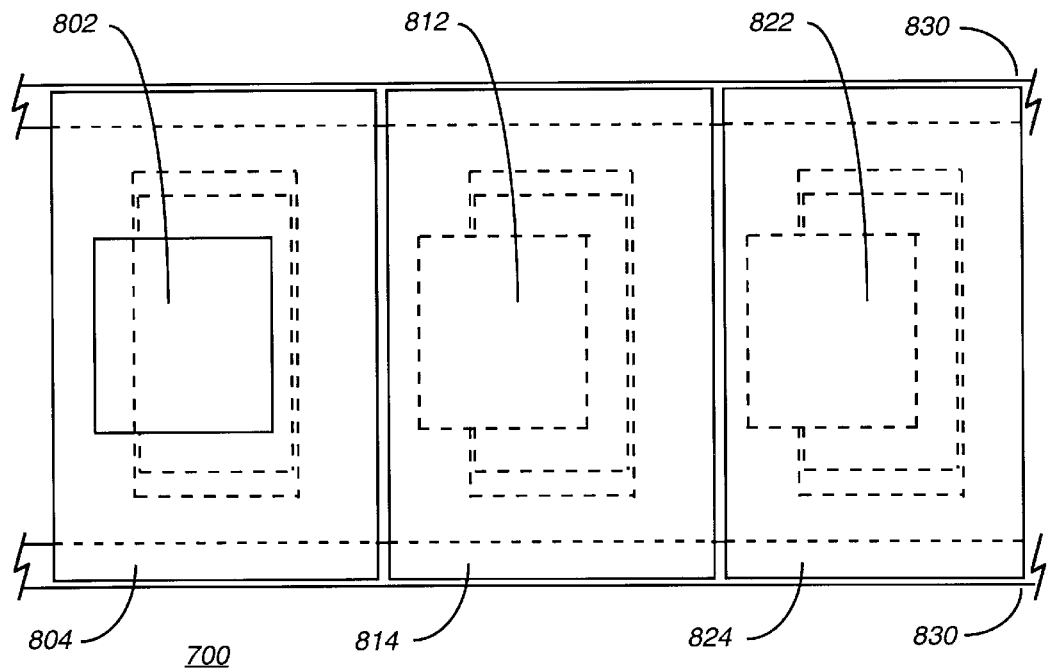
FIG. 7 is a top elevational view of a conveyor system utilizing reaction propulsion motors accordance with the present invention.

A reaction propulsion motor 200 utilizing a taut armature reciprocating impulse transducer 100 has been described in detail above which has been shown to provide both variable speed and bidirectional locomotion. The reaction propulsion motor 200 can be utilized in an apparatus, such as a conveyor system 700 shown in a top view in FIG. 7 which is utilized to transport a component, or device, between two locations. The conveyor system 700 utilizes a sequence of reaction propulsion motors, three of which are shown for the purposes of illustration. When the reaction propulsion motor 200 is used in a conveyor system, the conveyor element 204 becomes a platform, shown as a sequence of platforms 804, 814, and 824 upon which a component, or device, 802 can be transported. By way of example, a component 802 is shown being transported over the conveyor system 700 and being originally positioned on platform 802 and further traveling across platform 814 and then platform 824. The edges of the conveyor elements 204 which form the individual platforms 804, 814, and 824 rest on guides 830 which prevent the edges of the conveyor elements 204 from collapsing.

Figure 8:
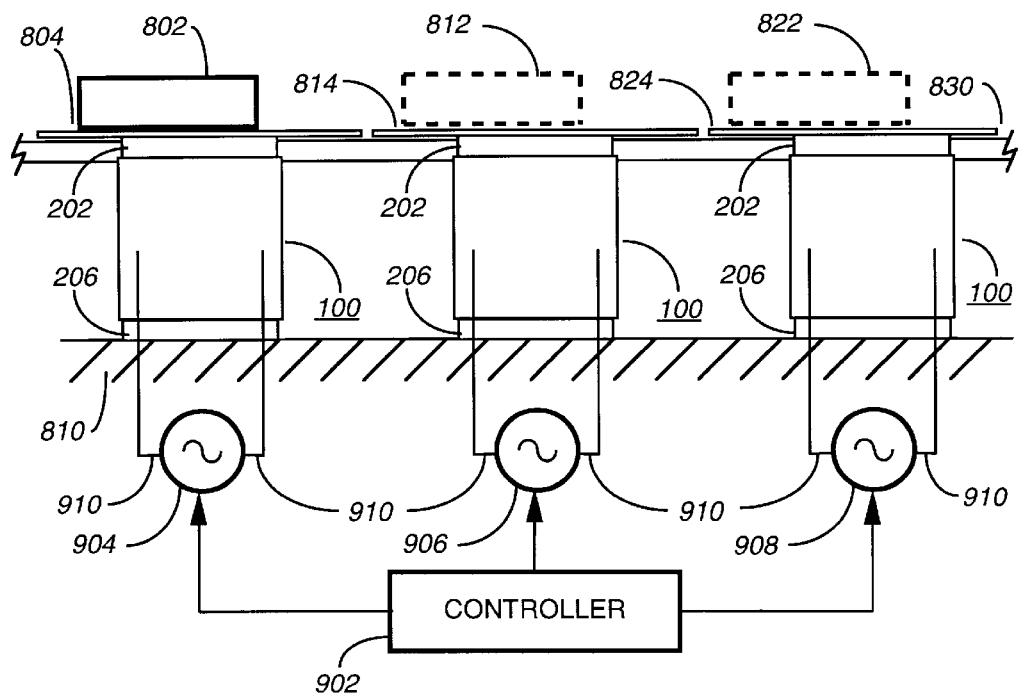
FIG. 8 is an electromechanical block diagram of a conveyor system utilizing reaction propulsion motors in accordance with the present invention.
Figure 9:
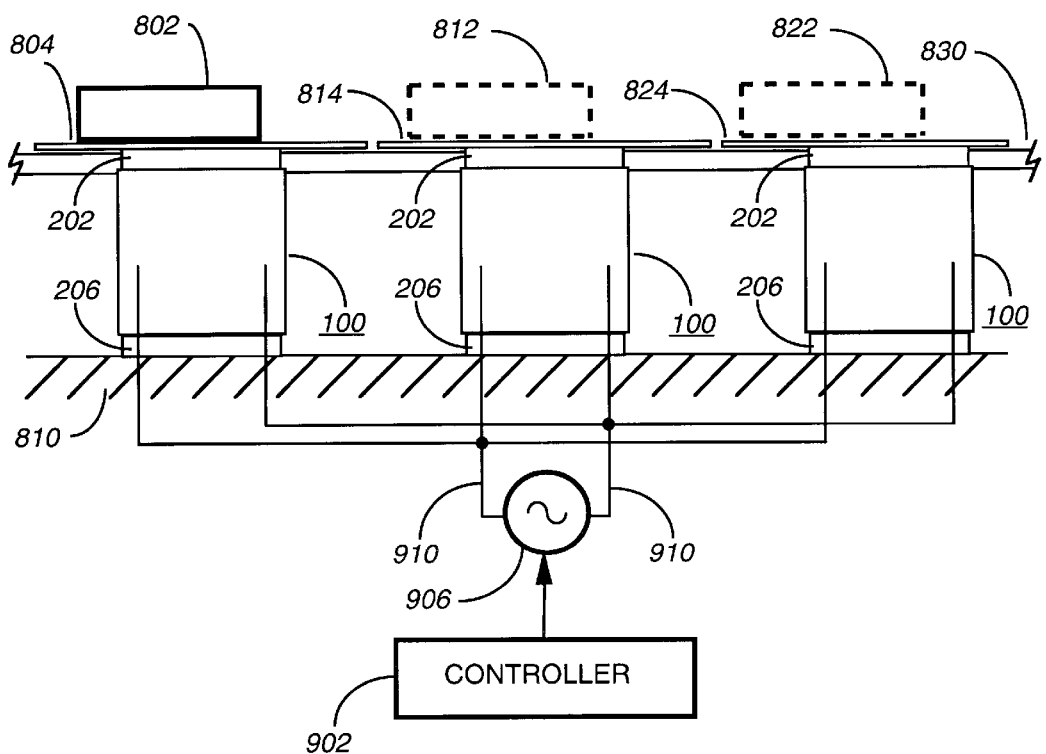
FIG. 9 is an electromechanical block diagram of a conveyor system utilizing reaction propulsion motors in accordance with an alternate embodiment of the present invention.

FIG. 8 is an electromechanical block diagram of a conveyor system 700 utilizing the reaction propulsion motor 200 in accordance with the first aspect of the present invention. Each reaction propulsion motor is secured to the frame 810 of the conveyor system 700 using a second transmission medium 206, which by way of example is also a double sided adhesive foam tape. Movement of the device 802 across the conveyor system 700 is controlled by a controller 902 which is electrically coupled to the taut armature reciprocating impulse transducers by way of wires 910. The controller 902 controls individual excitation sources 904, 906 and 908 which are each connected to an individual reaction propulsion motor 200, or which can be connected to a number of reaction propulsion motors in a sequence, such as shown in FIG. 9. By connecting individual reaction propulsion motors to the excitation source, as shown in FIG. 8, or groups of reaction propulsion motors to an excitation source, as shown in FIG. 9, the motion of the device 802 can be independently controlled over single platforms or groups of platforms. As an example, platform 814 can be de-energized to allow manipulation of the device while the device rests on platform 814 while the other platforms 804 and 824 can be transporting additional components at the same, lower, or higher speeds. When individual excitation sources are utilized to drive the reaction propulsion motors, their excitation frequency generated is synchronized so a to move the device 802 along the conveyor system at a constant rate of speed. Also, any discrepancies between the speeds generated by individual 1reaction propulsion motors can be canceled out.

In summary, a reaction propulsion motor 200 has been described which is variable speed and bidirectional, and which can be used to propel itself and a load along a surface. Multiple reaction propulsion motors can also be utilized in tandem to propel the load along a surface. The reaction propulsion motors can also be utilized by fixing the position of the reaction propulsion motor to form a conveyor system. A device can be moved along the conveyor system at a constant rate of speed, at an increased or increasing rate of speed, at a decreased or decreasing rate of speed, and when necessary, in a reverse direction, at a somewhat lower rate of speed. When the reaction propulsion motors are controlled from an individual excitation source, each of the platforms forming the conveyor system can be controlled in tandem, controlled individually, or sections of the conveyor system can be controlled individually and controlled in tandem.

We claim:

1. A reaction propulsion motor, comprising:
    a taut armature reciprocating impulse transducer having a motional mass which generates an excitation force in response to an excitation signal;
    a conveyor element, for translating the excitation force into locomotion; and
    a transmission medium, coupled between said taut armature reciprocating impulse transducer and said conveyor element, for coupling the excitation force generated to said conveyor element.

2. The reaction propulsion motor of claim 1, further comprising an excitation source which generates a variable frequency excitation signal, and wherein a speed and direction of locomotion of the reaction propulsion motor is determined by an initial frequency which is set for the variable frequency excitation signal.

3. The reaction propulsion motor of claim 2, wherein said excitation source is a variable frequency oscillator.

4. The reaction propulsion motor of claim 2, wherein the initial frequency of the variable frequency excitation signal determines when the reaction propulsion motor is propelled in a forward direction and in a reverse direction.

5. The reaction propulsion motor of claim 4, wherein increasing the frequency of the variable frequency excitation signal between a first predetermined excitation frequency and a second predetermined excitation frequency when the reaction propulsion motor is being propelled in a forward direction increases the speed of the reaction propulsion motor while maintaining the direction of locomotion.

6. The reaction propulsion motor of claim 5, wherein increasing the frequency of the variable frequency excitation signal above the second predetermined excitation frequency produces locomotion in the reverse direction.

7. The reaction propulsion motor of claim 5, wherein decreasing the frequency of the variable frequency excitation signal between the second predetermined excitation frequency and the first predetermined excitation frequency when the reaction propulsion motor is being propelled in the reverse direction increases the speed of the reaction propulsion motor while maintaining the direction of locomotion.

8. The reaction propulsion motor of claim 1, wherein said transmission medium has a predetermined size, and wherein said conveyor element is a plate which is larger in size than said transmission medium.

9. The reaction propulsion motor of claim 8, wherein said conveyor element is formed from a flexible material.

10. The reaction propulsion motor of claim 9, wherein the speed of the reaction propulsion motor is related to the excitation frequency, and is also related to the flexibility of the flexible material.

11. A conveyor system for transporting a component between two locations, comprising:
    a sequence of reaction propulsion motors, each having a conveyor element, to provide a sequence of platforms spanning between the two locations,
    said reaction propulsion motors being responsive to an excitation signal for effecting a movement of the component across said sequence of platforms;
    a transmission medium for individually coupling said sequence of reaction propulsion motors to a frame spanning between the two locations; and
    an excitation source for generating the excitation signal.

12. The conveyor system according to claim 11, wherein a reaction propulsion motor comprises:
    a taut armature reciprocating impulse transducer, having a motional mass which generates an excitation force in response to the excitation signal;
    a transmission medium coupled between said taut armature reciprocating impulse transducer and said conveyor element, for coupling the excitation force generated to said conveyor element; and
    said conveyor element translating the excitation force into movement of the component across said conveyor element forming a platform.

13. The conveyor system according to claim 11, wherein said excitation source generates a variable frequency excitation signal, and wherein said conveyor system further comprises a controller, coupled to said excitation source, for controlling a frequency of the variable frequency excitation signal, wherein the frequency of the variable frequency excitation signal controls a speed at which the component is transported between the two locations.

14. The conveyor system according to claim 13, wherein said controller sets an initial frequency of the variable frequency excitation signal to determine a speed and a direction of movement of the component across said conveyor element.

15. The conveyor system of claim 14, wherein the initial frequency of the variable frequency excitation signal which is set by said controller determines when the movement of the component across said conveyor element is in a forward direction, and in a reverse direction.

16. The conveyor system of claim 15, wherein said controller increases the frequency of the variable frequency excitation signal between a first predetermined excitation frequency and a second predetermined excitation frequency in order to effect an increase in speed of the component across said conveyor element in a forward direction.

17. The conveyor system of claim 16, wherein said controller increases the frequency of the variable frequency excitation signal above the second predetermined excitation frequency to produces movement of the component across said conveyor element in the reverse direction.

18. The conveyor system of claim 16, wherein said controller decreases the frequency of the variable frequency excitation signal between the second predetermined excitation frequency and the first predetermined excitation frequency in order to effect an increase in speed of the component across said conveyor element in a reverse direction.

19. The conveyor system of claim 12, wherein said transmission medium has a predetermined size, and wherein said conveyor element is a plate which is larger in size than said transmission medium.

20. The conveyor system of claim 19, wherein said conveyor element is formed from a flexible material, and wherein the speed of the component across said conveyor element is related to the excitation frequency, and is also related to the flexibility of the flexible material.

21. The conveyor system of claim 13 wherein each of said sequence of reaction propulsion motors is coupled to an excitation source controlled individually and in tandem by said controller.

22. The conveyor system of claim 13 wherein two or more of said sequence of reaction propulsion motors are coupled to an excitation source controlled by said controller.

* * * * *